United States Patent [19]
Machlica

[11] Patent Number: 5,910,353
[45] Date of Patent: Jun. 8, 1999

[54] MODIFIED PAPER COMPOSITE

[75] Inventor: Kenneth J. Machlica, Wrightstown, Wis.

[73] Assignee: Dunsirn Industries, Inc., Neenah, Wis.

[21] Appl. No.: 08/967,629

[22] Filed: Nov. 10, 1997

[51] Int. Cl.$^6$ ...................................................... B32B 3/00
[52] U.S. Cl. ...................... 428/195; 428/211; 428/423.1; 428/537.5
[58] Field of Search ................................ 428/195, 423.1, 428/511, 537.5, 211

[56] References Cited

U.S. PATENT DOCUMENTS 4,507,351  3/1985  Johnson et al. ......................... 428/198
5,244,702  9/1993  Finestone et al. ...................... 428/34.3
5,518,799  5/1996  Finestone et al. ...................... 428/137

*Primary Examiner*—Elizabeth Evans
*Attorney, Agent, or Firm*—Reinhart, Boerner, Van Deuren, Norris & Rieselbach, s.c.

[57] ABSTRACT

A composite material having two outer paper components and a plastic core component therebetween. In preferred embodiments, the core component includes two bias cut plys such that the core component is cross-laminated. The paper components are preferably toner receptive and/or laser ink printable.

16 Claims, 1 Drawing Sheet

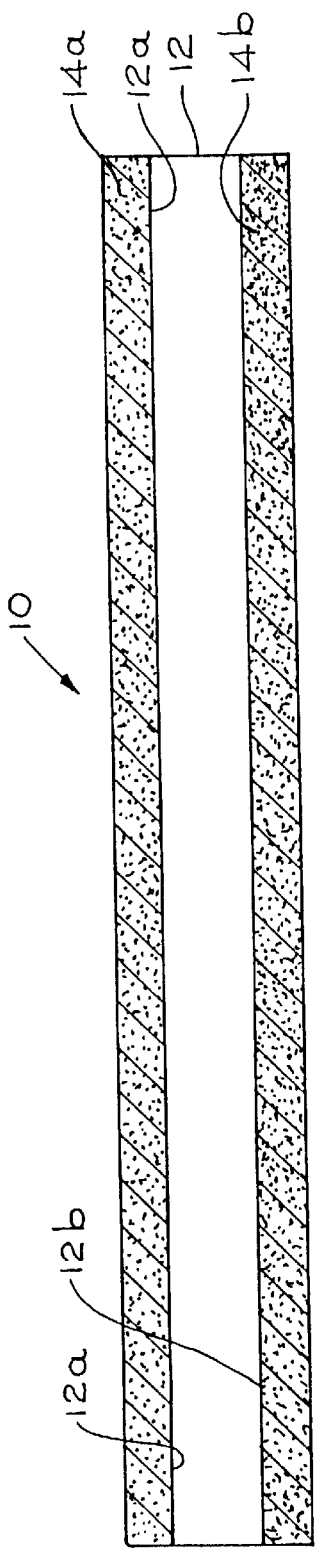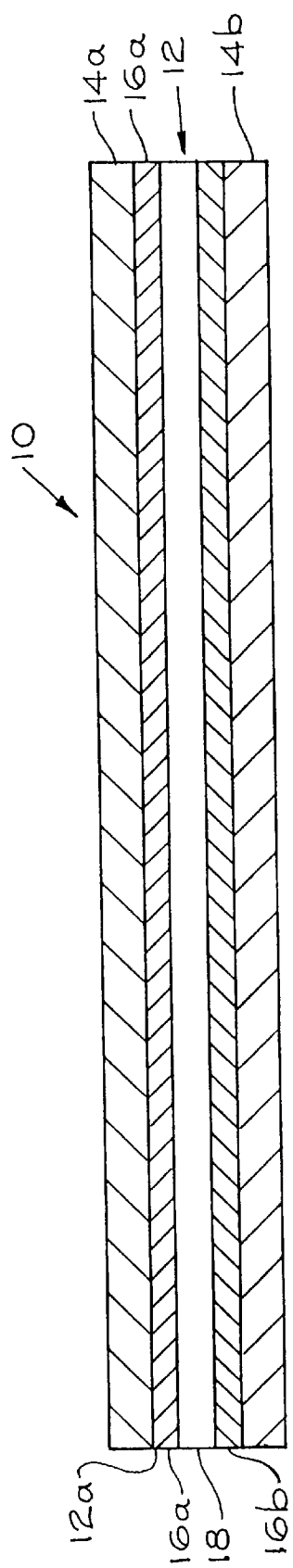

MODIFIED PAPER COMPOSITE

BACKGROUND OF INVENTION

This invention relates generally to paper composite materials and, more particularly, to such materials having an ultra-high tear resistant plastic core. The composites of this invention can be laser printed and used both indoors and outside, inasmuch as the paper component does not absorb water.

Paper is a semi-synthetic material made using chemically processed cellulose fibers. The advantages of paper as a medium for written communication include its low cost and the fact that it can readily be printed and colored using standard inks. However, paper has several disadvantages, including low tear and burst strength. It is also highly moisture absorbent unless treated with a water resistant material.

One approach to absorbency concerns has been the use of plastic-coated cellulosic papers, of the type used for posters, signs and shipping tags, and other products demanding resistance to hard wear and to outdoor exposure. Unfortunately, such plastic-coated papers lack suitable tear and burst strength. Another approach has been to coat papers on one or both sides with a suspension of clays, starches, rosin or wax, or a combination of these substances. Again, tear and burst strength are less than optimal.

In recent years, paper-like products have been made using polymeric plastic sheetings, such as those materials commercially-available under the Tyvec trademark. These products not only have a tear and bursting strength far superior to paper, but they are also waterproof However, such plastics have low affinities for adhesives and, as a result, are unsuitable for use in many fabricated products. They are, likewise, not suitable for laser print applications.

As is often the situation, the functional requirements for a specific end use application cannot be fully met by a single material. The search for a practical approach to a multi-functional material has been a long-standing concern in the art. Recently, various laminated materials have been devised to address the multi-functional requirement. U.S. Pat. No. 5,244,702 describes one such material: an outer paper sheet is adhered to a reinforcing film of synthetic plastic. The laminant is described as having good tear and burst strength characteristics, and as readily printable using standard inks.

Nonetheless, the prior art has associated with it a number of significant problems and deficiencies. Most are related to incomplete functional utility and result from the materials utilized. For instance, the materials described in the aforementioned '702 patent are described as having a paper component which absorbs water. Such a characteristic would not lend itself as suitable for outdoor applications.

Likewise, the materials disclosed in the '702 patent are described as having a high affinity for standard printing inks. The same materials are also described as having a tensile strength, but this quality is seriously impaired upon application of heat to the plastic film component. Laser printers are becoming increasingly popular, and laser print inks are not the standard printing inks mentioned in the '702 patent. It would appear that laser inks are excluded from the technology described in the '702 patent. This position is supported by the fact that most standard plastic films, such as those described in the '702 patent, will soften, disform and even melt at the operating temperatures of most desktop laser printers. On the other hand, materials of the prior art which are able to withstand such temperatures are invariably those which provide neither outdoor durability nor the required tear resistance that many applications demand. For instance, various polyesters will withstand the laser operating temperatures, but will not provide the necessary tear resistance for products that are either die-cut or perforated.

SUMMARY OF THE INVENTION

In summary, a considerable number of drawbacks and problems exist in the art relating to paper laminates. There is a need for an improved material better able to meet the emerging and ever-increasing functional demands made of the printing industry by end-use consumers.

Accordingly, it is an object of the present invention to provide a composite material having a modified construction which imparts new and improved functional characteristics, thereby overcoming various deficiencies and shortcomings of the prior art, including those outline above. It will be understood by those skilled in the art that one or more aspects of this invention can meet certain objectives, while one or more other aspects can meet certain other objectives. Each objective may not apply equally, and all instances, to every aspect of the present invention. As such, the following objects—in light of the prior art regarding such paper materials—can be viewed in the alternative with respect to any one aspect of the present invention.

It can also be an object of the present invention to provide a composite having a core material which is tear and/or burst resistant, even if die-cut or perforated as part of an end-use product application.

It can also be an object of the present invention to provide a composite with a paper component resistant to the absorption of water so as to provide improved outdoor function and durability.

Another object of the present invention can be to provide a composite having laser printable paper surface components, as well as a plastic component which does not lose its integrity or molecular orientation upon application of heat.

It can also be an object of the present invention to provide, in conjunction with a paper material, a multi-ply plastic core component such that tear and/or burst strengths are preserved even after die-cutting or perforation.

Other objects, features and advantages of the present invention will be apparent from the following summary of the invention and description of preferred embodiments, and will be readily apparent to those skilled in the art having knowledge of various composite materials. Such objects, features, benefits and advantages will be apparent from the above as taken in conjunction with the accompanying examples, tables, data and all reasonable inferences to be drawn therefrom.

In part, the present invention is a composite material having two outer paper components and a plastic core component there between. The plastic core component includes a laminate of two outer plys, each of which is bias cut at an angle less than 90°. Each outer ply is oriented such that its bias cut is opposite the orientation the bias cut of the other ply. In such a fashion, the core component can be described as cross-laminated. An inner ply can be situated between the outer play, regardless of whether it has a bias cut or a particular orientation. Preferably, for most applications, the plastic core material has a thickness dimension of about 1.5 mils to about 3.5 mils. Various plastic materials can be utilized, but high density polyethylene is preferred.

With respect to the orientation of bias cuts, the core component is cross-laminated at an angle of 180 degrees minus 2x degrees, and x is the measurement of the bias cut angle of the outer plys. In preferred embodiments, each outer ply is bias cut at a 45° angle, such that the plastic core component is cross-laminated at an angle of 90°.

Likewise, in preferred embodiments, the outer paper component of such a composite material is sorption product of paper and a latex composition. Each paper component also, preferably, includes a toner-receptive coating such that the composite material is laser printable. Each of the outer paper components is bonded to an opposed surface of the plastic core material. Either a wet-bonding or dry-bonding process can be used to construct the composite.

In part, the present invention is also a laser-printable composite material having a plastic core material between two outer paper components. Each paper component has a laser print receptive coating. As described above, the plastic core material can be the cross-laminated product of two bias cut plys. An inner ply can be incorporated as part of the plastic core. In such embodiments, the inner ply can be extruded without a bias cut and without substantial orientation. Overall, the composite material of this invention can have a dimensional thickness of about 6 mils to about 12 mils. Such a dimension permits laser ink to be imprinted on at least one of the paper components.

In part, the present invention is a paper composite, including a plastic core material having two opposed surfaces, each of which is bonded to a paper component. The paper component is the sorption product of paper and a latex. As described more fully above, a useful plastic core material can be the cross-laminated product of bias cut plys. Where an inner ply is positioned between two outer plys, the inner ply can be extruded, without a bias cut and without substantial molecular orientation. Regardless, a preferred plastic material is high density polyethylene. Regardless of material composition, the plastic core preferably has a dimensional thickness of about 1.5 mils to about 3.5 mils, such that the paper composite has an overall dimensional thickness of about 6 mils to about 12 mils. In highly preferred embodiments, a paper composite having such a dimension also includes a toner-receptive coating such that it is laser printable.

As mentioned above, a multi-ply or laminated core component can be used with the present invention. Such a component offers distinct performance advantages over the single-ply materials of the prior art, including the materials described in the aforementioned '702 patent. The improvements in performance test results and/or magnitude of the improvement is both surprising and unexpected. Furthermore, use of a multi-ply or laminated component in a composite of this sort is contrary to the art. Such a use would not be thought possible given the results described in the '702 patent. In contrast thereto, lamination in accordance with this invention does not introduce weak points or fault lines into the core component. Reference is made to several examples, below, which illustrate the marked improvements available through use of this invention.

Regardless of whether the present composite includes a laminated core material, certain heretofore unobtainable advantages are realized through use of the paper components described above. Various routes can be taken to achieve a water proof/resistant paper, as will be well-known to those of skill in the art and made aware of this invention. One such route involves latex impregnated paper, which is commercially available through a number of sources.

As mentioned above, preferred embodiments of the present invention include those having laser printable paper components. To that effect, such components can be appropriately dimensioned for auto feeding and are also toner receptive. The result achieved is a permanent laser ink imprint. Toner materials, laser imprintable inks and processing techniques for the application of each will be well-known to those skilled in the art and made aware of this invention. Such techniques and materials when used in conjunction with the water proof/resistant paper component of this invention will provide an outdoor durable laser imprintable composite. For instance, barcodes can be read and registered months after outdoor use when laser imprinted on any of the inventive materials. The composites described herein can be used over a broad range of applications, including without limitation the following: forestry/holiday tree tags, sawmill log tags, steel tags, gate passes and special event tickets, airline bag tags, transit tickets, freight/load tags, outdoor durable signage, lumber labels, pharmaceutical labels, nursery tags and membership cards. Such composites and the end-use products derived therefrom are available exclusively under the Dura-laz trademark from Dunsirn Industries of Neenah, Wis.

BRIEF DESCRIPTION OF THE DRAWINGS

FIG. 1 is a schematic side cross-sectional view of a composite material, in accordance with this invention and showing a core bonded on each surface to a water proof/resistant paper component.

FIG. 2 is a schematic side cross-sectional view of a composite material, in accordance with this invention, showing a preferred cross-laminated core.

It should be noted that both FIGS. 1 and 2 are illustrative only and neither are to scale with respect to the dimensional thickness of any one component.

DETAILED DESCRIPTION OF PREFERRED EMBODIMENTS

The composite materials of this invention can have various arrangements and configurations, two of which are illustrated in FIGS. 1 and 2. With reference to FIG. 1, composite 10 has core component 12 with opposed surfaces 12a and 12b, respectively. Paper components 143a and 14b are secured to the corresponding core surfaces, 12a and 12b. Without limitation to any one figure or configuration, the paper components can be secured to the core by any suitable method or technique, as would be well-known to those skilled in the art. In preferred embodiments of the present invention, a wet-bonding process, such as that using commercially-available adhesive materials, can be used with good effect and is a further basis for distinction over the technology described in the aforementioned '702 patent.

As best shown in FIG. 2, core component 12 can be comprised of multiple plys. For example, outer plys 16a and 16b have an opposed configuration about inner ply 18. In such a manner, plys 16a and 16b form the opposed surfaces of core component 12 that is, surfaces 12a and 12b, respectively.

As mentioned above, a preferred material choice for core component 12 is high density polyethylene. Such a material is also highly preferred for a multi-ply configuration. Other suitable materials will be well-known to those skilled in the art and can be used in conjunction with the present invention, providing they meet the objectives and criteria set forth herein.

In preferred embodiments, a multi-ply configuration is prepared such that core component 12 is cross-laminated. In preparation thereof, each ply is separately extruded then oriented, preferably by way of an annealing process to remove plastic memory. Each ply is then bias cut at a desired angle x; typically, each ply will be bias cut at the same angle. Bias cutting results in each ply having a molecular orientation at angle x with respect to the length dimension of the ply. The plys are then brought together and arranged such that the bias cut and molecular orientation of each is opposite with respect to the other. The result is a cross lamination, such as that schematically represented by plys 16a and 16b, in FIG. 2. In preferred embodiments, as also shown in FIG. 2, an inner ply can be extruded and arranged between each bias cut outer ply. Typically, but not necessarily, any such inner ply will lack a molecular orientation.

EXAMPLES OF THE INVENTION

The following non-limiting examples and data illustrate various aspects and features relating to the composites and/or materials of this invention, including the surprising and unexpected modification and/or improvement of various functional qualities, including outdoor durability and laser printability.

The composite of this Example 1 is a light weight indoor, high tear resistant, laser printable laminated tag. The unique construction incorporates a premium laser paper as the outer two layers, and a thin-gauge, ultra-high tear resistant core material. No hole reinforcement is required. Tear propagation will not occur even if the composite is nicked, perforated, hole punched, or die-cut.

Example 1

| Property | Typical Value |
| --- | --- |
| Caliper: | 7.2–7.6 Mil |
| Yield: | 230# / MMSI |
| Tear Strength: | 2200 gms min |
| Tensile Strength: | 22 lbs./inch of width |
| Sheffield Smoothness: | 110 top and bottom |
| Brightness: | 87 |
| pH: | Alkaline (Acid-free) |

A composite having this physical profile is designed for demanding indoor applications, whereby end users require an ultra-strong tear-resistant tag material that can be desk top laser imprinted.

Example 2

This example shows the physical parameters typical of another material usable as an indoor, high tear resistant, laser printable laminated tag. The composite of this example also incorporates a premium laser paper as the outer two layers, and a thin-gauge, ultra-high tear resistant core material.

| Property | Typical Value |
| --- | --- |
| Caliper: | 11.2–11.7 Mil |
| Yield: | 333# / MMSI |
| Tear Strength: | 2200 gms min |
| Tensile Strength: | 22 lbs./inch of width |
| Sheffield Smoothness: | 150 top and bottom |
| Brightness: | 84 |

As shown by the caliper property, this composite material is "heavier" than the composite of Example 1.

Example 3

| Property | Typical Value |
| --- | --- |
| Caliper: | 9.0–9.5 Mil |
| Yield: | 300–340# / MMSI |
| Tear Strength: | 5100 gms min |
| Tensile Strength: | 52 lbs./inch of width |
| Sheffield Smoothness: | 60 top and bottom |
| Gloss (75 degrees): | 30 |

This example illustrates physical attributes associated with a composite, in accordance with this invention, useful as an outdoor-durable, high tear resistant, laser printable laminated tag. This composite incorporates an outdoor-durable (designed for a minimum of six months) laser paper as the outer layers, and a thin-gauge high tear resistant laminated core material. Bonding of all layers is performed utilizing an outdoor water-resistant adhesive.

Examples 4–6, below, provide comparative test data illustrating several functional and performance advantages available through use of the present invention. The prior art is represented by a single ply low density polypropylene material such as that disclosed in the aforementioned '702 patent and available under the Tyvec 1079 trademark. For comparison purposes, the indicated tests were also run using a cross-laminated high density polyethylene material (7.5 mil), in accordance with this invention and available under the Valéron trademark.

Example 4

Uninitiated tear strength was compared using the ASTM D 1938 standard test procedure and showed the cross-laminated material requiring a greater force (43 Newtons) than the single ply material (17 Newtons).

Example 5

Initiated tear strength was compared using the ASTM D 1004 standard test procedure and showed the cross-laminated material requiring a greater force (56 Newtons) than the single ply material (33 Newtons).

Example 6

The wire pull test (reference, 26 Ga Wire Pull Test) was conducted and showed the cross-laminated material requiring a greater force (26 pounds force) than the single ply material (6 pounds force).

While the principles of this invention have been described in connection with specific embodiments, it should be understood clearly that these descriptions, along with the chosen tables and data therein, are made only by way of example and are not intended to limit the scope of this invention, in any manner. Other advantages and features of this invention will become apparent from the following claims, with the scope thereof determined by the reasonable equivalents, as understood by those skilled in the art.

I claim:

1. A composite material having two outer paper components and a plastic core component therebetween, said core component is high density polyethylene having a thickness dimension of about 1.5 mils to about 3.5 mils and comprises a laminate of first and second outer plys, each of which is bias cut at an angle less than 90%, and an inner ply, each said outer ply having a bias cut oriented opposite the bias cut of said other outer ply, such that said core component is cross-laminated.

2. The composite material of claim 1 wherein each said outer paper component is the sorption product of paper and a latex.

3. The composite material of claim 2 wherein each said paper component include a toner-receptive coating such that the composite material is laser printable.

4. The composite material of claim 1 wherein said core component is cross-laminated at an angle of (180–2x), wherein x is the bias cut angle of each said outer ply.

5. The composite material of claim 4 wherein each of said first and second outer plys is bias cut at a 45° angle, and said core component is cross-laminated at an angle of 90°.

6. The composite material of claim 1 wherein each of said outer paper components is wet-bonded to said plastic core component.

7. The composite material of claim 6 wherein at least one said paper component is a sorption product of paper and a latex.

8. A laser-printable composite material comprising a plastic core material between two outer paper components, wherein each said component has a laser print receptive coating thereon and said plastic core material is the cross-laminated product of bias cut plys.

9. The composite material of claim 8 wherein said core material has an inner ply which is extruded, absent a bias cut and absent substantial orientation.

10. The composite material of claim 8 having a dimensional thickness of about 6 mils to about 12 mils, wherein laser ink is imprinted on at least one of said components.

11. A paper composite, comprising a plastic core material having first and second surfaces and bonded on each surface to a paper component, said component the sorption product of paper and a latex and said plastic core material wet-bonded to at least one paper component and the cross-laminated product of bias cut plys.

12. The paper composite of claim 11 wherein said plastic core material is high density polyethylene.

13. The paper composite of claim 11 wherein said core material has an inner ply which is extruded, absent a bias cut and absent substantial orientation.

14. The paper composite of claim 11 having a dimensional thickness of about 6 mils to about 12 mils.

15. The paper composite of claim 14 wherein said plastic core material has a dimensional thickness of about 1.5 mils to about 3.5 mils.

16. The paper composite of claim 11 wherein each paper component includes a toner-receptive coating such that said composite is laser printable.

\* \* \* \* \*